(12) United States Patent
Singhal et al.

(10) Patent No.: US 12,373,845 B2
(45) Date of Patent: Jul. 29, 2025

(54) METHOD AND SYSTEM OF INTELLIGENTLY MANAGING CUSTOMER SUPPORT REQUESTS

(71) Applicant: Microsoft Technology Licensing, LLC, Redmond, WA (US)

(72) Inventors: Sunil Singhal, New Delhi (IN); Bamdev Mishra, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 17/712,678

(22) Filed: Apr. 4, 2022

(65) Prior Publication Data

US 2023/0316298 A1    Oct. 5, 2023

(51) Int. Cl.
   *G06Q 30/016*    (2023.01)
   *G06F 40/12*    (2020.01)
   *G06F 40/40*    (2020.01)

(52) U.S. Cl.
   CPC .......... *G06Q 30/016* (2013.01); *G06F 40/12* (2020.01); *G06F 40/40* (2020.01)

(58) Field of Classification Search
   CPC ...... G06Q 30/016; G06Q 10/10; G06F 40/12; G06F 40/40
   See application file for complete search history.

(56) References Cited

U.S. PATENT DOCUMENTS

| | | |
|---|---|---|
| 7,529,827 B2 | 5/2009 | Devraj et al. |
| 8,868,973 B2 | 10/2014 | Milojicic et al. |
| 8,935,153 B2 | 1/2015 | Mckeeman et al. |
| 10,459,951 B2 | 10/2019 | Venkataraman et al. |
| 11,409,752 B1* | 8/2022 | Qadrud-Din .......... G06F 40/126 |
| 2008/0155564 A1 | 6/2008 | Shcherbina et al. |

(Continued)

OTHER PUBLICATIONS

Aalipour, Ghodrat, et al. "Applications of sequence to sequence models for technical support automation." 2018 IEEE International Conference on Big Data (Big Data). IEEE, 2018. (Year: 2018).*

(Continued)

*Primary Examiner* — Corey Russ
(74) *Attorney, Agent, or Firm* — NovoTechIP International PLLC

(57) ABSTRACT

A system and method for automatically identifying an operating procedure for resolving a customer support request includes receiving a customer support request for resolving an issue, encoding the issue into one or more text encoding representations, providing the one or more text encoding representations as a first input to a matching and selection unit, providing operating procedure encodings for a plurality of operating procedures as a second input to the matching and selection unit, comparing, by the matching and selection unit, the one or more text encoding representations to the operating procedure encodings to identify one or more operating procedures for resolving the issue, and providing the one or more operating procedures as recommendations for resolving the issue, wherein at least one of the one or more text encoding representations and the operating procedure encodings are generated by utilizing a geometric progressing natural language processing (NLP) algorithm.

20 Claims, 8 Drawing Sheets

(56) References Cited

U.S. PATENT DOCUMENTS

| | | | |
|---|---|---|---|
| 2009/0190839 A1* | 7/2009 | Higgins | G06F 16/3347 382/209 |
| 2009/0210745 A1 | 8/2009 | Becker et al. | |
| 2010/0268526 A1* | 10/2010 | Bradford | G06F 40/42 707/739 |
| 2012/0323968 A1* | 12/2012 | Yih | G06F 16/31 707/E17.069 |
| 2017/0011302 A1 | 1/2017 | Heckman et al. | |
| 2017/0060366 A1* | 3/2017 | Alexander | G06F 16/3325 |
| 2017/0068657 A1* | 3/2017 | Palmonari | G06F 40/232 |
| 2017/0221015 A1* | 8/2017 | June | G06Q 30/016 |
| 2017/0243137 A1* | 8/2017 | Mandel | H04M 3/5166 |
| 2017/0286970 A1* | 10/2017 | Pelletier | G06Q 30/016 |
| 2017/0286972 A1* | 10/2017 | Hausler | G06N 3/044 |
| 2017/0372231 A1* | 12/2017 | Ghatage | G06F 40/58 |
| 2019/0065948 A1* | 2/2019 | Henry | G06Q 30/016 |
| 2020/0265340 A1* | 8/2020 | Chang | G06N 20/10 |
| 2020/0272792 A1* | 8/2020 | Jayaraman | G06N 3/045 |
| 2020/0372215 A1* | 11/2020 | Uchida | G06F 40/284 |
| 2020/0410400 A1* | 12/2020 | Shklarski | G16H 50/70 |
| 2021/0224306 A1* | 7/2021 | Choudhary | G06Q 30/0281 |
| 2022/0044111 A1* | 2/2022 | Singh | G06F 40/30 |
| 2022/0067295 A1 | 3/2022 | Alikiaamiri et al. | |
| 2023/0244869 A1* | 8/2023 | Neumann | G06F 40/284 382/176 |

OTHER PUBLICATIONS

Nuruzzaman, Mohammad, and Omar Khadeer Hussain. "A survey on chatbot implementation in customer service industry through deep neural networks." 2018 IEEE 15th international conference on e-business engineering (ICEBE). IEEE, 2018. (Year: 2018).*

"International Search Report and Written Opinion issued in PCT Application No. PCT/US2023/010978", Mailed Date: Mar. 14, 2023, 9 Pages.

Townsend, et al., "Pymanopt: A Python Toolbox for Optimization on Manifolds using Automatic Differentiation", In Journal of Machine Learning Research, vol. 17, Issue 1, Jan. 1, 2016, 5 Pages.

Xing, et al., "Normalized Word Embedding and Orthogonal Transform for Bilingual Word Translation", In Proceedings of the 2015 Conference of the North American Chapter of the Association for Computational Linguistics: Human Language Technologies, May 31, 2015, pp. 1006-1011.

Zhang, et al., "Adversarial Training for Unsupervised Bilingual Lexicon Induction", In Proceedings of the 55th Annual Meeting of the Association for Computational Linguistics (vol. 1: Long Papers), Jul. 30, 2017, pp. 1959-1970.

Zhang, et al., "Earth Mover's Distance Minimization for Unsupervised Bilingual Lexicon Induction", In Proceedings of the Conference on Empirical Methods in Natural Language Processing, Sep. 7, 2017, pp. 1934-1945.

Zhou, et al., "Learning Bilingual Sentiment Word Embeddings for Cross-language Sentiment Classification", In Proceedings of the 53rd Annual Meeting of the Association for Computational Linguistics and the 7th International Joint Conference on Natural Language Processing (vol. 1: Long Papers), Jul. 26, 2015, pp. 430-440.

Schonemann, Peterh., "A Generalized Solution of the Orthogonal Procrustes Problem", In Journal of Psychometrika, vol. 31, Issue 1, Mar. 1966, 10 Pages.

Smith, et al., "Offline Bilingual Word Vectors, Orthogonal Transformations and the Inverted Softmax", In Proceedings of the International Conference on Learning Representations, Feb. 13, 2017, pp. 1-10.

Søgaard, et al., "On the Limitations of Unsupervised Bilingual Dictionary Induction", In Proceedings of the 56th Annual Meeting of the Association for Computational Linguistics (vol. 1: Long Papers), Jul. 15, 2018, pp. 778-788.

Speer, et al., "ConceptNet at SemEval-2017 Task 2: Extending Word Embeddings with Multilingual Relational Knowledge", In Proceedings of the 11th International Workshop on Semantic Evaluation (SemEval), Aug. 3, 2017, 5 Pages.

Steen, et al., "What is Azure Cognitive Search?", Retrieved From: https://docs.microsoft.com/en-us/azure/search/search-what-is-azure-search, Jan. 1, 2022, 7 Pages.

Sun, et al., "How to Automatically Resolve Trouble Tickets with Machine Learning", Retrieved From: https://www.ericsson.com/en/blog/2020/10/how-to-resolve-trouble-tickets-machine-learning, Oct. 16, 2020, 12 Pages.

"Transitioning from a Manual to Automated SOP System", Retrieved From: https://compliancebridge.com/sop-system/, Jul. 13, 2017, 6 Pages.

Absil, et al., "Optimization Algorithms on Matrix Manifolds", In Publication of Princeton University Press, Sep. 2008, 237 Pages.

Ammar, et al., "Massively Multilingual Word Embeddings", In Repository of arXiv:1602.01925v2, May 21, 2016, 10 Pages.

Artetxe, et al., "A Robust Self-Learning Method for Fully Unsupervised Cross-Lingual Mappings of Word Embeddings", In Proceedings of the 56th Annual Meeting of the Association for Computational Linguistics, Jul. 15, 2018, pp. 789-798.

Artetxe, et al., "Generalizing and Improving Bilingual Word Embedding Mappings With a Multi-Step Framework of Linear Transformations", In Proceedings of the AAAI Conference on Artificial Intelligence, Apr. 27, 2018, pp. 5012-5019.

Artetxe, et al., "Learning Bilingual Word Embeddings with (Almost) no Bilingual Data", In Proceedings of the 55th Annual Meeting of the Association for Computational Linguistics, Jul. 30, 2017, pp. 451-462.

Artetxe, et al., "Learning Principled Bilingual Mappings of Word Embeddings While Preserving Monolingual Invariance", In Proceedings of the Conference on Empirical Methods in Natural Language Processing, Nov. 1, 2016, pp. 2289-2294.

Barone, Antonio Valerio Miceli, "Towards Cross-Lingual Distributed Representations Without Parallel Text Trained with Adversarial Autoencoders", In Proceedings of the 1st Workshop on Representation Learning for NLP, Aug. 9, 2016, pp. 121-126.

Bonnabel, et al., "Riemannian Metric and Geometric Mean for Positive Semidefinite Matrices of Fixed Rank", In SIAM Journal on Matrix Analysis and Applications, vol. 31, Issue 3, Oct. 21, 2009, pp. 1-24.

Boumal, et al., "Manopt, a Matlab Toolbox for Optimization on Manifolds", In Journal of Machine Learning Research, vol. 15, Issue 1, Jan. 1, 2014, pp. 1455-1459.

Camacho-Collados, et al., "Nasari: Integrating Explicit Knowledge and Corpus Statistics for a Multilingual Representation of Concepts and Entities", In Journal of Artificial Intelligence, vol. 240, Nov. 1, 2016, pp. 36-64.

Camacho-Collados, et al., "SemEval-2017 Task 2: Multilingual and Cross-lingual Semantic Word Similarity", In Proceedings of the 11th International Workshop on Semantic Evaluation, Aug. 3, 2017, 12 Pages.

Cartacio, et al., "What is Automated Machine Learning (AutoML)?", Retrieved From: https://docs.microsoft.com/en-us/azure/machine-learning/concept-automated-ml, Jan. 25, 2022, 15 Pages.

Chandar, et al., "An Autoencoder Approach to Learning Bilingual Word Representations", In Proceedings of the Advances in Neural Information Processing Systems, Dec. 8, 2014, pp. 1-9.

Chen, et al., "Unsupervise Multilingual Word Embeddings", In the Conference on Empirical Methods in Natural Language Processing, Oct. 31, 2018, pp. 261-270.

Conneau, et al., "Word Translation Without Parallel Data", In the International Conference on Learning Representations, Jan. 30, 2018, pp. 1-14.

Dinu, et al., "Improving Zero-Shot Learning by Mitigating the Hubness Problem", In Repository of arXiv:1412.6568v3, Apr. 15, 2015, pp. 1-10.

Doval, et al., "Improving Cross-Lingual Word Embeddings by Meeting in the Middle", In Proceedings of the 2018 Conference on Empirical Methods in Natural Language Processing, Oct. 31, 2018, pp. 294-304.

(56) References Cited

OTHER PUBLICATIONS

Duong, et al., "Multilingual Training of Crosslingual Word Embeddings", In Proceedings of the 15th Conference of the European Chapter of the Association for Computational Linguistics, vol. 1, Apr. 3, 2017, pp. 894-904.
Edelman, et al., "The Geometry of Algorithms with Orthogonality Constraints", In SIAM journal on Matrix Analysis and Applications, vol. 20, Issue 2, Jun. 19, 1998, pp. 1-45.
Faruqui, et al., "Improving vector space word representations using multilingual correlation", In Proceedings of the 14th Conference of the European Chapter of the Association for Computational Linguistics, Apr. 26, 2014, pp. 462-471.
Gardner, et al., "Translation Invariant Word Embeddings", In Proceedings of the 2015 Conference on Empirical Methods in Natural Language Processing, Sep. 17, 2015, pp. 1084-1088.
Gilley, et al., "Tutorial: Train and Deploy an Image Classification Model with an Example Jupyter Notebook", Retrieved From: https://docs.microsoft.com/en-us/azure/machine-learning/tutorial-train-deploy-notebook, Jan. 11, 2022, 13 Pages.
Gouws, et al., "Bilbowa: Fast bilingual distributed representations without word alignments", In Proceedings of the 32nd International Conference on Machine Learning, Jul. 6, 2015, 9 Pages.
Gower, J.C., "Generalized Procrustes Analysis", In Journal of Psychometrika, vol. 40, Issue 1, Mar. 1975, pp. 33-51.
Grave, et al., "Unsupervised Alignment of Embeddings with Wasserstein Procrustes", In Technical Report, arXiv preprint arXiv:1805.11222, May 29, 2018, 11 Pages.
Gu, et al., "Universal Neural Machine Translation for Extremely Low Resource Languages", In Proceedings of the Conference of the North American Chapter of the Association for Computational Linguistics: Human Language Technologies, Jun. 1, 2018, pp. 344-354.
Hammerla, et al., "Aligning the FastText Vectors of 78 Languages", Retrieved From: https://web.archive.org/web/20220120072251/https://github.com/babylonhealth/fastText_multilingual, Jan. 20, 2022, 10 Pages.
Harandi, et al., "Joint Dimensionality Reduction and Metric Learning: A Geometric Take", In Proceedings of the International Conference on Machine Learning, vol. 70, Aug. 6, 2017, 10 Pages.
Hermann, et al., "Multilingual Models for Compositional Distributed Semantics", In Proceedings of the Annual Meeting of the Association for Computational Linguistics, Jun. 23, 2014, pp. 58-68.
Hoshen, et al., "Non-Adversarial Unsupervised Word Translation", In Proceedings of the Conference on Empirical Methods in Natural Language Processing, Oct. 31, 2018, pp. 469-478.
Huang, et al., "ROPTLIB: An Object-Oriented C++ Library for Optimization on Riemannian Manifolds", In Proceedings of ACM Transactions on Mathematical Software, Jul. 31, 2018, 21 Pages.
Jawanpuria, et al., "Learning Multilingual Word Embeddings in Latent Metric Space: A Geometric Approach", In Journal of Transactions of the Association for Computational Linguistics, vol. 7, Aug. 1, 2019, pp. 107-120.
Joulin, et al., "Loss in Translation: Learning Bilingual Word Mapping With a Retrieval Criterion", In Proceedings of the 2018 Conference on Empirical Methods in Natural Language Processing, Oct. 31, 2018, pp. 2979-2984.
Kementchedjhieva, et al., "Generalizing Procrustes Analysis for Better Bilingual Dictionary Induction", In Proceedings of the 22nd Conference on Computational Natural Language Learning, Oct. 31, 2018, pp. 211-220.
Klementiev, et al., "Inducing crosslingual distributed representations of words", In Proceedings of the International Conference on Computational Linguistics: Technical Papers, Dec. 2012, pp. 1459-1474.
Lazaridou, et al., "Hubness and Pollution: Delving into Cross-Space Mapping for Zero-Shot Learning", Proceedings of the 53rd Annual Meeting of the Association for Computational Linguistics and the 7th International Joint Conference on Natural Language Processing, Jul. 26, 2015, pp. 270-280.
Lee, John M., "Introduction to Smooth Manifolds", In the Book Graduate Texts in Mathematics, vol. 218, 2012, 726 Pages.
Meyer, et al., "Linear Regression Under Fixed-Rank Constraints: A Riemannian Approach", In Proceedings of the 28th International Conference on International Conference on Machine Learning, Jun. 28, 2011, 8 Pages.
Mikolov, et al., "Efficient Estimation of Word Representations in Vector Space", In Repository of arXiv:1301.3781v3, Jan. 16, 2013, pp. 1-9.
Mikolov, "Exploiting similarities among languages for machine translation.", In Repository of arXiv:1309.4168v1, Sep. 17, 2013, 10 Pages.
Mishra, et al., "Fixed-Rank Matrix Factorizations and Riemannian Low-Rank Optimization", In Journal of Computational Statistics, vol. 29, Issue 3, Apr. 24, 2013, 33 Pages.
Roy, et al., "Geometry Aware Constrained Optimization Techniques for Deep Learning", In Proceedings of the IEEE Conference on Computer Vision and Pattern Recognition, Jun. 18, 2018, pp. 1-10.
Sato, et al., "A New, Globally Convergent Riemannian Conjugate Gradient Method", In Journal of Mathematical Programming and Operations Research, vol. 64, Issue 4, Aug. 2, 2013, pp. 1-22.

* cited by examiner

METHOD AND SYSTEM OF INTELLIGENTLY MANAGING CUSTOMER SUPPORT REQUESTS

BACKGROUND

It is common for users of computer systems and software programs to encounter some issues with their devices and/or programs. When the device and/or program is maintained by an organization (e.g., the organization that develops and sells the software program) and the user is unable to resolve the issue on their own, the user can often reach out to the organization that maintains the program to request assistance with addressing the issue. This is often done by submitting a customer support request.

When a customer support request is received, the receiving organization is responsible for analyzing the request and identifying a solution for resolving the issue. This often requires manual intervention by one or more individuals who may need to access a library of operating procedures for handling customer support issues, determining if an operating procedure for addressing the issue exists in the library, and using an identified operating procedure when one is available. When an applicable operating procedure does not exist, then the individual may have to come up with a procedure to address the issue. This may require input from one or more additional individuals, which results in use of more time and human resources. As a result, for complex systems and programs that encounter many problems, resolving customer support requests requires substantial human intervention and is cost and resource intensive.

Hence, there is a need for improved systems and methods of intelligently managing customer support requests.

SUMMARY

In one general aspect, the instant disclosure presents a data processing system having a processor and a memory in communication with the processor wherein the memory stores executable instructions that, when executed by the processor, cause the data processing system to perform multiple functions. The function may include receiving a customer support request for resolving an issue, encoding the issue into one or more text encoding representations, providing the one or more text encoding representations as a first input to a matching and selection unit, providing operating procedure encodings for a plurality of operating procedures as a second input to the matching and selection unit, comparing, by the matching and selection unit, the one or more text encoding representations to the operating procedure encodings to identify one or more operating procedures for resolving the issue, and providing the one or more operating procedures as recommendations for resolving the issue, wherein at least one of the one or more text encoding representations and the operating procedure encodings are generated by utilizing a geometric progressing natural language processing (NLP) algorithm.

In yet another general aspect, the instant disclosure presents a method for automatically identifying an operating procedure for resolving a customer support request. In some implementations, the method includes receiving a customer support request for resolving an issue, encoding the issue into one or more text encoding representations, providing the one or more text encoding representations as a first input to a matching and selection unit, providing operating procedure encodings for a plurality of operating procedures as a second input to the matching and selection unit, comparing, by the matching and selection unit, the one or more text encoding representations to the operating procedure encodings to identify one or more operating procedures for resolving the issue, and providing the one or more operating procedures as recommendations for resolving the issue, wherein at least one of the one or more text encoding representations and the operating procedure encodings are generated by utilizing a geometric progressing NLP algorithm.

In a further general aspect, the instant application describes a non-transitory computer readable medium on which are stored instructions that when executed cause a programmable device to perform function of receiving a customer support request for resolving an issue, encoding the issue into one or more text encoding representations, providing the one or more text encoding representations as a first input to a matching and selection unit, providing operating procedure encodings for a plurality of operating procedures as a second input to the matching and selection unit, comparing, by the matching and selection unit, the one or more text encoding representations to the operating procedure encodings to identify one or more operating procedures for resolving the issue, and providing the one or more operating procedures as recommendations for resolving the issue, wherein at least one of the one or more text encoding representations and the operating procedure encodings are generated by utilizing a geometric progressing NLP algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
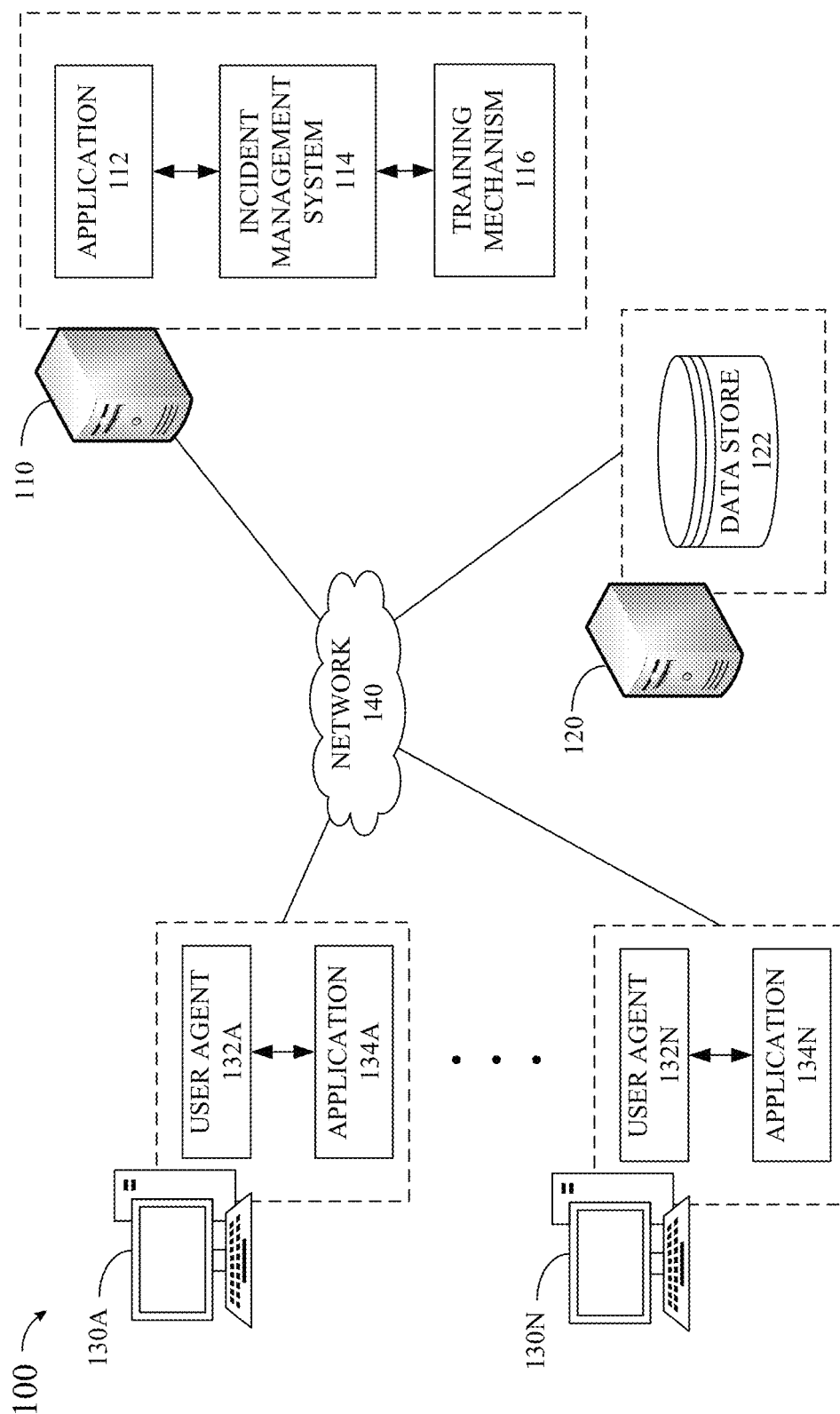
FIG. 1A depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Many currently used software applications enable users to raise issues when they encounter a problem with their programs. For example, many software development companies provide mechanisms for enterprise customers to submit customer support requests when they are faced with issues in the program. This is often done by utilizing a customer support feature of the program and/or using a customer incident management application. To raise the issue, the customer often describes the problem they are facing in their natural language in a customer support request (e.g., customer escalation ticket). Once the request is received, one or more individuals from a technical support team who is tasked with handling customer support requests, may review the customer support request to understand the problem being faced by the customer. After reviewing the request, the technical support team member often needs to search for and discover an appropriate operating procedure for resolving the problem from among a plethora of such documents. This may require substantial time, expertise and effort. Thus, there exists a technical problem of current mechanisms for handling customer support request being inefficient and costly.

Moreover, in many situations, an operating procedure for handling the raised issue does not exist. Thus, the technical support team member may spend a lot of time and effort without being able to find a solution for addressing the issue. Furthermore, available operating procedures for resolving an issue commonly become obsolete after some time due to changes in the system or program. As a result, after spending time and effort identifying an operating procedure, the customer support team member or the customer itself may realize that an identified operating procedure does not resolve the issue. When an operating procedure does not exist or has become obsolete, the team member handling the issue may need to seek help from other team members (e.g., software developers, engineers, etc.) to create a procedure for resolving the issue. This may require the use of substantial time and effort on the part of multiple individuals, may lead to passage of an extended time period before the issue is resolved for the customer, and may thus decrease system availability and reliability. As a result, customer satisfaction may be negatively affected which may result in financial losses. Thus, there exists a technical problem of lack of adequate mechanisms for addressing customer support issues in a timely and efficient manner that does not require extensive human input and avoids extended system unavailability.

To address these technical problems and more, in an example, this description provides technical solutions for intelligently analyzing customer support requests, automatically identifying one or more operating procedures for addressing the issue raised in the request, when such operating procedures exist, and presenting the identified operating procedures for display. Furthermore, the technical solutions may automatically create an appropriate operating procedure for handling an issue based on an analysis of the issues raised in the request and an examination of prior procedures used to handle similar issues. This may be achieved by utilizing a geometric progressing natural language processing (NLP) algorithm that maps operating procedures to customer support requests and synthetizes an operating procedure from the collected data. Once an operating procedure is created, it may be stored in a library of operating procedures and provided as a suggestion in a user interface (UI) screen for handling the issue. In this manner, the technical solutions provide a customer support system that can quickly and efficiently identify or create operating procedures for handling customer support issues, thus minimizing the amount of manual intervention required, increasing the accuracy of identifying appropriate solutions and increasing customer satisfaction.

As will be understood by persons of skill in the art upon reading this disclosure, benefits and advantages provided by such implementations can include, but are not limited to, a technical solution to the technical problems of lack of mechanisms for efficient, accurate and user-friendly handling of customer support requests. The technical solutions allow a user to quickly and efficiently identify, review and access procedures for resolving computer issues, thus minimizing manual input and downtime and therefore improves the operation and efficiency of computer systems. Furthermore, the technical solutions present identified procedures for handling computer issues in an easily accessible and understandable graphical user interfaces. The technical effects at least include (1) improving the efficiency and accuracy of resolving computer system issues by decreasing the amount of downtime and increasing the chances of success in resolving the issue; (2) improving the efficiency of searching for and identifying appropriate operating procedures for handling computer system issues; and (3) improving the efficiency of handling computer system issues for which an operating procedure for resolving the issue does not exist by automatically creating an operating procedure; and (4) increasing the accuracy of operating procedures by taking feedback data into account and dynamically updating the models when new data is available.

As used herein, the terms "customer support request," "customer escalation" or "customer ticket" may refer to an input received from a customer that provides an explanation for an issue the customer is facing in using their computer system and/or software program. The input may be a textual input received via a customer support portal. The term "operating procedure" may refer to a set of instructions created for resolving an issue. The operating procedures may be a standard set of one or more commands that are stored in a document (e.g., Word document, OneNote document, and the like) for resolving a particular issue. The operating procedures may set out a standard procedure for handling a specific issue.

FIG. 1A illustrates an example system 100, upon which aspects of this disclosure may be implemented. The system 100 may include a server 110, which may itself include an application 112, an incident management system 114 and a training mechanism 116. While shown as one server, the server 110 may represent a plurality of servers that work together to deliver the functions and services provided by each engine or application included in the server 110. The server 110 may operate as a shared resource server located at an enterprise accessible by various computer client devices such as a client devices 130A-130N. The server 110 may also operate as a cloud-based server for incident management services in one or more applications such as application 112 and/or application 134.

The server 110 may include and/or execute an incident management system 114, which may receive a customer support request from an application such as the application 112 or 134 and may process the request by identifying one or more operating procedure for resolving an issue identified in the request. The customer support request may be submitted by a user via a UI element of the application 112 or 134. In an example, the customer support request may be submitted via a communications application (e.g., by sending an email to a customer support email address). The incident management system 114 may automatically analyze the content of the customer support request to identify one or more issues that need to be addressed. Once the issues are identified, the incident management system 114 may search for and identify one or more operating procedures for resolving the identified issues. When no responsive operating procedure is identified, the incident management system 114 may automatically generate an operating procedure, based on one or more parameters. These actions may be performed by utilizing one or more ML models that perform NLP, conduct searches and/or generate operating procedures, as discussed in greater detail with respect to FIG. 1B.

One or more ML models implemented by the incident management system 114 may be trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. The initial training may be performed in an offline stage. Additionally, and/or alternatively, the one or more ML models may be trained using batch learning.

As a general matter, the methods and systems described herein may include, or otherwise make use of one or more ML model to perform NLP, vectorize operating procedures and/or customer support requests, compare operating procedures with customer support requests and automatically generate operating procedures. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in operating procedures and/or customer support requests, determine associations between various words and commands, and identify keywords and/or classify content. Such training may be made following the accumulation, review, and/or analysis of data over time. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 may include a server 120 which may be connected to or include the data store 122 which may function as a repository in which databases relating to training models, operating procedure libraries and/or history of customer support requests may be stored. Although shown as a single data store, the data store 122 may be representative of multiple storage devices and data stores which may be accessible by one or more of the incident management system 114, training mechanism 116, and applications 112/134.

The client devices 130A-130N may be connected to the server 110 via a network 140. The network 140 may be a wired or wireless network(s) or a combination of wired and wireless networks that connect one or more elements of the system 100. Each of the client devices 130A-130N may be a type of personal, business or handheld computing device having or being connected to input/output elements that enable a user to interact with various applications (e.g., application 112 or application 134). One or more of the client devices 130A-130N may be utilized by a customer to submit a customer support request or may be used by a troubleshooter to review and/or respond to customer support requests. Examples of suitable client devices 130 include but are not limited to personal computers, desktop computers, laptop computers, mobile telephones, smart phones, tablets, phablets, smart watches, wearable computers, gaming devices/computers, televisions; and the like. The internal hardware structure of a client device is discussed in greater detail with respect to FIGS. 5 and 6.

One or more of the client devices 130A-130N may include a local application 134. The application 134 may be a computer program executed on the client device that configures the device to be responsive to user input to allow a user to interactively submit a customer support request, review the status of a customer support request, and/or review suggestions for addressing the issues raised in the customer support request. Examples of suitable applications include, but are not limited to, an incident management application and a communications application.

In some examples, the application used to submit a customer support request, review and respond to a customer support request and/or review suggestions for addressing an issue raised in a customer support request is executed on the server 110 (e.g., application 112) and provided via an online service. In some implementations, web applications communicate via the network 140 with a user agent 132A-132N, such as a browser, executing on the client devices 130A-130N. The user agent 132A-132N may provide a user interface that allows the user to interact with the application 112.

Figure 1B:
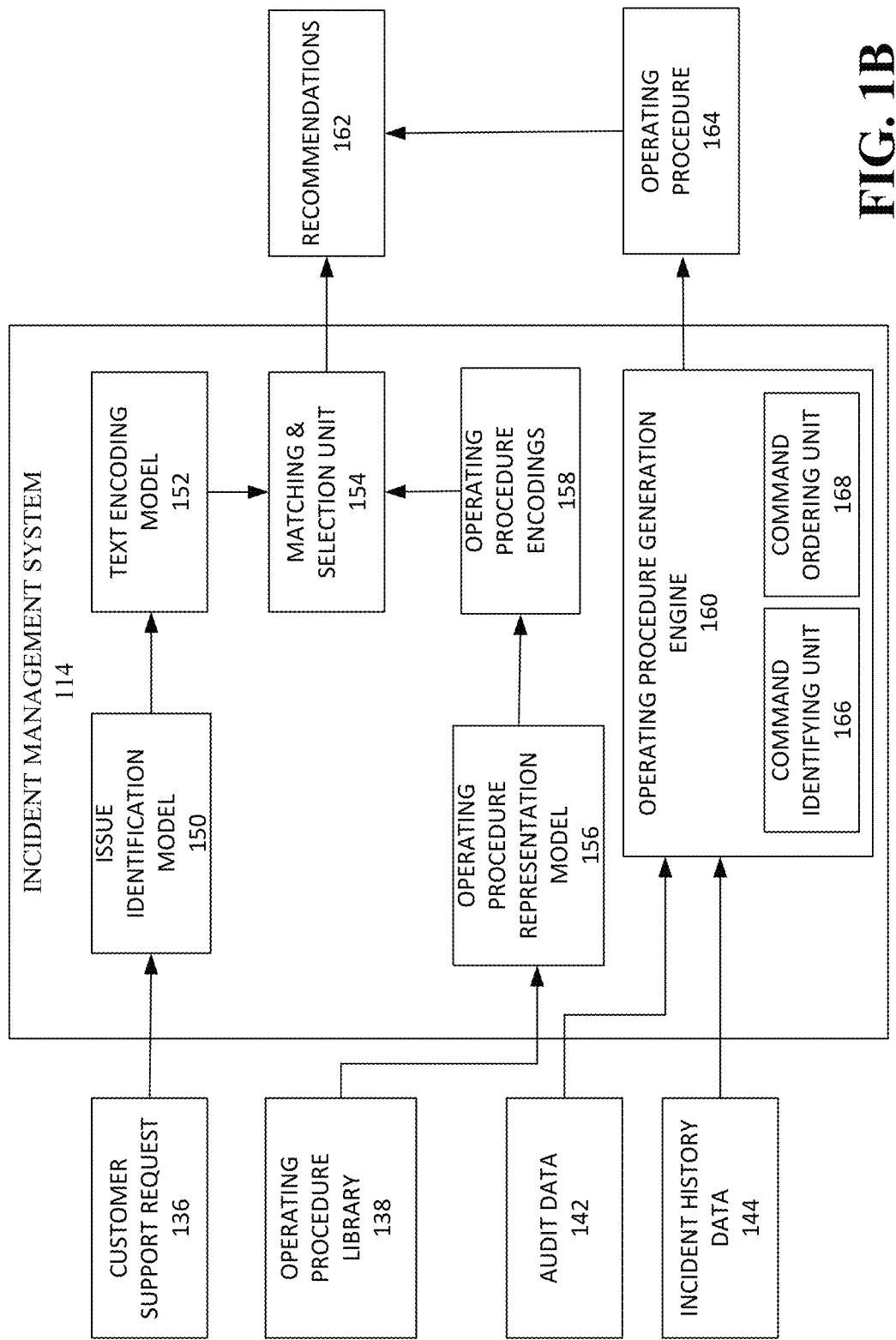
FIG. 1B depicts an example data flow between some elements of an example system upon which aspects of this disclosure may be implemented.

FIG. 1B depicts an example data flow between some of the elements of the example system 100. The incident management system 114 may include an issue identification model 150, an operating procedure representation model 158, an operating procedure generation model 162 and a matching and selection unit 154. A customer support request 136 may be received via an application that provides functionality for submitting a customer support request. As discussed above, the customer support request 136 may be submitted by a user that is reporting a computer related incident or an issue they require assistance with. The customer support request may be a live-site issue that is generated in real-time when an issue is encountered. The customer support request 136 may include text that describes the issue in a natural language (e.g., the user's natural language). For example, the customer support request 136 may include a detailed explanation of the incident, the frequency with which it occurs, a timeline for its' occurrence and/or other data. Alternatively, the customer support request 136 may include only a few keywords or phrases related to the issue. In another example, the customer support request 136 may include a title and a separate explanation of the issues. The customer support request 136 may also include metadata relating to the customer who is submitting the request, the application from which the request is generated, the computing device from which it is being generated, time/date data and the like.

In some implementations, the customer support request may be generated automatically, when one or more issues with an application or computing device is encountered in a system. For example, some computing systems may automatically send a request for system support when a software program crashes a predetermined number of times within a given time period. In some implementations, the customer support request is submitted via a communications application by sending a message (e.g., an email message or an instant message) to specific people (e.g., a troubleshooting team).

Once a customer support request 136 is received, the incident management system 114 may transmit the request 136 to the issue identification model 150 for processing. The issue identification model 150 may be an NLP model developed for analyzing the content of the customer support request 136 to identify keywords and/or other elements that are indicative of specific incidents. For example, if the customer support request 136 is a long message that contains a detailed explanation of the issues encountered, the issue identification model 150 may analyze the message, remove information that does not seem relevant to the issue (e.g., time stamp information, email addresses, user identification information, etc.), and remove commonly used words (e.g., stop words). The issue identification model 150 may also give more weight to rarely occurring words. This may be done by utilizing a Term Frequency-Inverse Document Frequency (TF-IDF) algorithm that analyzes the words in the customer support request 136. Once processed in this manner, the processed customer support request 136 will likely contain one or more keywords or phrases that are indicative of the issues encountered.

The processed customer support request 136 may then be transmitted to a text encoding model 152 for conversion into vector encodings. The text encoding model 150 may be a trained ML model for encoding textual inputs into text vector encodings. For example, the text encoding model 150 may convert the text of the processed customer support request 136 into vector encodings in a vector space. In an example, the processed customer support request 136 is converted to a multi-dimensional vector space (e.g., 256 dimensions). The trained text encoding model 150 may encode the tokens in the processed customer support request 136 in such a manner that the text embedding representations correspond to one or more concepts of the operating procedures. This may involve use of a geometric progress algorithm that performs joint dimensionality reduction on the vector embeddings. For example, a rotation may be applied to the vector embeddings to enable optimized matching with operating procedures, as discussed further below.

The incident management system 114 may have access to an operating procedure library 138. The operating procedure library 156 may be stored in a storage medium such as the storage server 120 of FIG. 1A (e.g., in data store 122). Alternatively, different portions of the operating procedure library 138 may be stored in different storage mediums. For example, the operating procedure library 138 may include internal documents, web documents, and/or automatically generated operating procedures. In an example, a database or index file of operating procedures that are up to date and available for use is generated and stored in a storage medium such as the storage server 120 of FIG. 1A.

Searching such a vast collection of operating procedures that may be stored in different locations can be complex, time consuming and require extensive use of computer resources. Furthermore, operating procedures often change, evolve and/or become obsolete. When operating procedures change, manual support is often needed to identify an appropriate operating procedure or generate one, if an existing one is not available. This results in additional costs and resources. To address these technical problems, the technical solutions provided herein makes use of a geometric progression NLP algorithm to map operating procedures to customer support requests. This may be achieved by utilizing an operating procedure representation model 156 for converting the operating procedures of the operating procedure library 138 to vector encodings that are associated with the customer support requests.

The operating procedure representation model 156 may be a model trained to convert operating procedures into dense numerical vector encodings. The operating procedure representation model 156 may be trained such that it can index operating procedures into vector encodings in the same vector space as the customer support requests. Thus, the operating procedure representation model 156 may process each of the operating procedures in the operating procedure library 138 to convert them to operating procedure encodings 158 which may then be used to facilitate matching and selection at runtime. In an example, the operating procedure representation model 156 converts the operating procedures into a multi-dimensional vector space (e.g., 256 dimensions) that has the same number of dimensions as the vector space into which the customer support request is converted. Furthermore, the operating procedure representation model 156 may apply a required degree of rotation to the vector space to ensure mapping with the customer support request vector space. It should be noted that while the operating procedure encodings 158 is depicted as being included in the incident management system 114, the operating procedure encodings 158 may be stored in a storage medium accessible to the incident management system 114, such as the data store 122.

In some implementations, the process of converting an operating procedure to a vector embedding occurs once. Thus, when the operating procedure representation model 156 is trained, it may process the operating procedure library 138 to convert the operating procedures to the operating procedure encodings 158. This process may be repeated in the future for new or revised operating procures but may not need to occur for existing operating procedures. Furthermore, the process may not need to occur in real-time when a customer support request is being processed. This can significantly the amount of processing and computing resources needed at runtime to process customer support requests.

After a customer support request 136 has been received and converted into a text vector encoding, the text encoding may be transmitted to the matching and selection unit 154 for processing. The matching and selection unit 154 may compare the text encoding 152 with the operating procedure encodings 150 to identify operating procedures that are likely to address the issues raised in the customer support request. To compare the text encoding 152 with the visual assets, the matching and selection unit 154 may compute similarity scores between the text encodings of the customer support request and the operating procedure encodings 158. This may be done by using the cosine vector similarity metric to estimate the degree of similarity between a text encoding and an operating procedure encoding. In an example, the matching is done based on the distance notion between the text encoding and the operating procedure encodings. Given a customer support request feature x and operating procedures $z_1, z_2, \ldots, z_m$, the matching and selection unit 154 may compute the similarity scores as cosine similarities between $x \times U \times C$ and $z_i \times V \times C$ for all i (1 ... m), where U and V are rotation matrices, B is the Mahalanobis distance, and C is the matrix square root of B (i.e., $B = C \times C$). In this manner, the matching and selection unit 154 may make use of a progressing natural NLP algorithm to compare the one or more text encoding representations with the operating procedure encodings.

After the similarity scores for all the operating procedures have been calculated, the operating procedures may be sorted based on their similarity scores. The most highly ranked operating procedures (e.g., ones having the highest similarity scores) may then be selected as the recommended operating procedures. In an example, a predetermine number (e.g., 5) of the operating procedures having the highest similarity scores are selected. In another example, the matching and selection unit 154 selects operating procedures whose similarity score exceeds a threshold similarity measure as the recommended operating procedures.

Once the operating procedures are ranked and selected, the selected operating procedures may be retrieved from the operating procedure library 138 and transmitted as the recommendations 162 to the incident management application. In an example, a link to the selected operating procedures is transmitted to the incident management application and/or communicated directly to the customer and/or troubleshooter (e.g., via an email message). The link to the recommended operating procedures may then be displayed to the user to enable the user to quickly and efficiently access the operating procedure to determine how to resolve the issue.

When an operating procedure cannot be identified for a customer support request (e.g., none of the operating procedures have a similarity score that exceeds a predetermined threshold) and/or when a customer support request is processed manually (e.g., without the use of an operating procedure), the operating procedure generation engine 160 may be utilized to automatically generate an operating procedure. This may be done to provide a synthetically generated operating procedure for addressing an issue raised by a customer quickly and efficiently and without the need for human intervention, even when an operating procedure for addressing the issue is not available. Furthermore, the operating procedure generation engine 160 may be utilized, when the incident management system 114 determines that an issue was either mitigated or resolved manually and/or when an action is taken and recorded as a discussion history in the incident management system for an issue. In this manner, the incident management system 114 is able to automatically generate operating procedures based on troubleshooter actions, even when they do not take the time to generate an operating procedure. As a result, the next time a similar action is encountered, an operating procedure would be available for use.

To automatically generate an operating procedure, the operating procedure generation engine 160 may first retrieve audit data 142 and/or incident history data 144. The incident history data 144 may include a log of previous incidents related to a software program and/or computing system. The incident history data 144 may include one or more keywords related to each incident (e.g., an incident title), an explanation of the incident, a time window during which the incident was active, history of the customer support request (e.g., discussion history in the customer support ticket) and/or actions taken (e.g., commands executed). In an example, the discussion history of the customer support request may include information about the steps taken to address the issues raised in the request. The audit data 142 may include a log of commands executed by a person (e.g., manual steps taken by a person). The audit data 142 may be used in combination with the incident history data 144 to identify steps taken to address an issue raised in a customer support request. For example, if a customer support request indicates that a particular troubleshooter was responsible for handling the request and the request was resolved on a given date and time, the audit data 142 may be consulted for actions taken by the troubleshooter on the given date/time to identify the particular commands executed to address the issues raised in the request.

The operating procedure generation engine 160 may utilize the information provided by the issue identification model 150 to identify the issues raised by a new customer support request. Once the issues are identified, the operating procedure generation engine 160 may search the incident history data 144 for similar incidents. This may be achieved by using heuristics (e.g., using metadata or correlation fields such as Monitor Id which remain the same for each incident when any metric goes out of trend) and/or by employing an ML model. In an example similar incidents are identified by using clustering techniques and/or cosine similarity and Manhattan distance algorithms. In an example, this involves retrieving a predetermined number of past similar issues.

After similar incidents are identified, a time window for addressing the incident may be generated. This may be achieved by collecting timestamp information associated with the incident. For example, timestamps associated with start, acknowledge, mitigate, resolve and end actions for the incident may be collected. The time window for the incident may then be defined as the time between start and end timestamps. Once the time window is defined, information about how the previous similar incidents were handled may be retrieved from the incident history data 144 and the audit data 142 for the defined time window.

In some implementations, the collected information is transmitted to a command identifying unit 166 to determine if the information contains a command. In an example, the command identifying unit 166 is a trained binary classifier model for detecting commands. When a command is detected, the information may be transmitted to a multiclass label classification model to identify a type for the command. In some implementations, the classification model is created by adding SoftMax layers on top of a pre-trained Bidirectional Encoder Representations from Transformers (BERT) model and fine tuning the model created in this manner with training data. Once the type of an identified command is detected, the operating procedure generation engine 160 may identify the different command components for the command. This may involve generating a common command sample having common command components and then comparing the identified command's components to the common command sample to identify the different components of the identified command. The different components may then be used to generate a similar command for addressing the issue raised by the new customer support request.

Once multiple commands for addressing a similar issue have been identified and/or analyzed to detect their components, one or more of the commands may be used to generate a list of commands for addressing the raised issue. In some implementations, a command ordering unit 168 of the operating procedure generation engine 160 is utilized to determine the order in which the commands should be used. In an example, this involves maintaining separate ordered set of commands based on the timestamp for the issue as well as past similar incidents. For example, if command Cx was executed at time Tx, command Cy was executed at time Ty, and command Cz at Tz, where Tx<Ty<Tz, then commands for the new operating procedure may be ordered as [Cx, Cy, Cz]. The separate sets of commands may then be merged into a single ordered set of commands. Merging can be as simple as appending the command lists or can include identifying various branches and determining which one of the commands become part of which branch.

Different merging strategies based on prefix/suffix and topological sorting may be used to further sequence and group a list of commands in a branch. For example, for two separate ordered list of commands C1 and C2, when C1=[Ci, Cj, Ck, Cl] and C2=[Ci, Cj, Cm, Cl], the following sequence of commands can be generated:
1. Execute Ci
2. Execute Cj
3. Check Cj output, if Cj.X=='XX', then
   3a. Execute Ck
   3b. Else, Execute Cm
4. Execute Cl After the commands are ordered properly, the operating procedure generation engine 160 may make use of command documentation (e.g., documents that list information about the identified commands) to add descriptive text to one or more of the commands in the list. The additional text may provide some information to the user who utilizes the operating procedure generated in this manner about the purpose of a command and/or how to use it. Moreover, the operating procedure generation engine 160 may utilize the title and/or description of the issue in the customer support request and/or information about previous similar incidents to generate some descriptive sections for the operating procedure. For example, the operating procedure generation engine 160 may utilize one or more keywords from the title of the customer support request for the title of the operating procedure. Furthermore, some portions of the description of issue, description of similar incidents and/or information from operating procedures that address similar incidents may be added to the generated operating procedure.

Furthermore, formatting may be applied to the generated operating procedure to ensure that the final procedure complies with standard formatting requirements and/or is presented in an easily understandable and usable format. For example, markdown formatting may be applied such that commands are included in code blocks. In an example, a simplified unformatted operating procedure which includes some command documentation may include the following.

C1: Performs task X done
C2: Performs task Y in the system
   C2.1: Performs task XX
C3

The above unformatted operating procedure may be converted to the following operating procedure by applying formatting rules.

Scenario: Use when issue Z occurs
Pre-req:
Troubleshooting Steps:
   1. Execute C1 to perform task X
   2. Execute C2 and check C2 output
      2a. Execute C2.1 to perform task XX
   3. Execute C3
Mitigation \Resolution Steps:
   1. CR1
References
Similar Incidents:
   [Tags]

Thus, a simplified list of commands may be automatically formatted such that the final operating procedure complies with standard formatting requirements of an organization.

The ordered and formatting operating procedure may be generated as an electronic document (e.g., a word processing document or text document) that contains the list of commands and/or descriptive information needed for addressing the raised issue. In this manner, the operating procedure generation engine 160 utilizes previous command history and information to automatically generate an operating procedure for handling new issues. This significantly increases efficiency, reduces the need for human intervention and decreases the amount of time required to address issues raised by customers.

The generated operating procedure 164 may be transmitted as an output of the operating procedure generation engine 160 for storage and/or display to the user. In an example, the operating procedure 164 is transmitted for storage in the operating procedure library 138. The newly generated operating procedure may also be provided to the operating procedure representation model 156 such that one or more operating procedure encodings may be generated for the new operating procedure. In this manner, as operating procedures are generated automatically, the operating procedure encodings may be dynamically updated to include the latest data.

A link to the newly generated operating procedure 164 may then be provided as a recommendation 162 for display to the user. In some implementations, the link is added to the customer support request ticket such that the customer and/or the troubleshooter reviewing the request may have quick access to the operating procedure for addressing the raised issue. The customer and/or troubleshooter may then utilize the link to open the operating procedure 164 and follow the instructions provided (e.g., execute the commands in order) to resolve the issue.

Figure 1C:
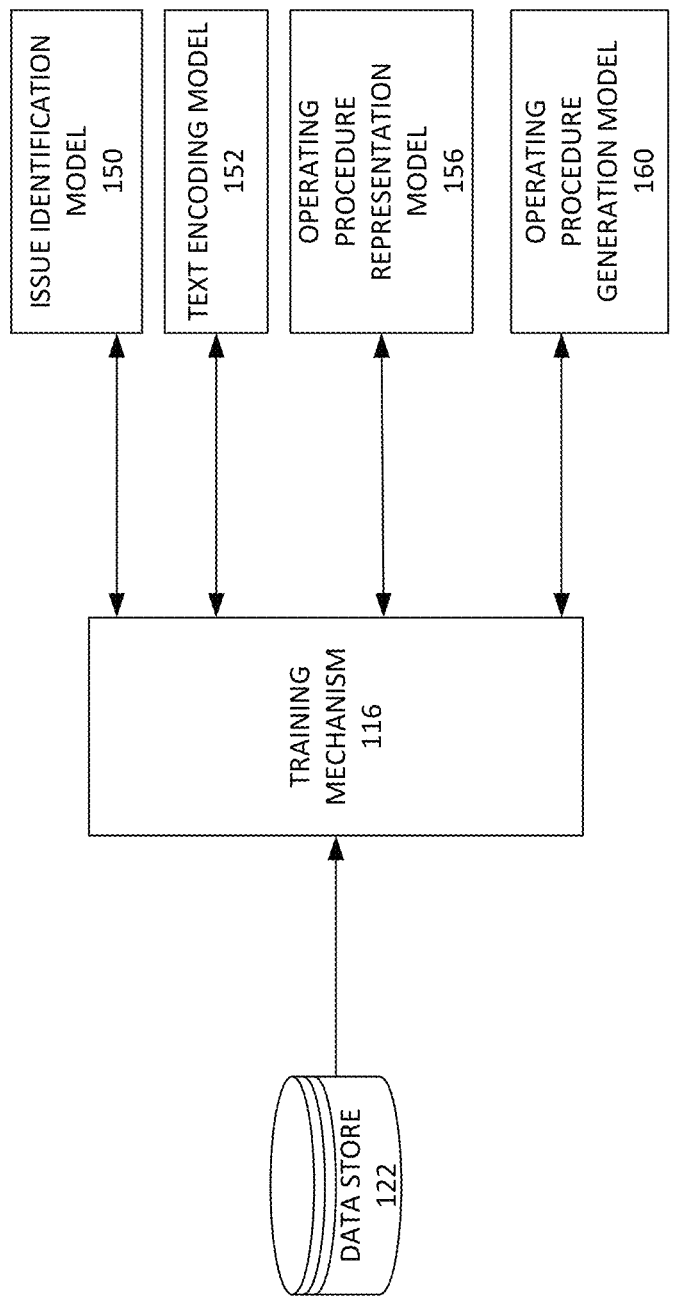
FIG. 1C how one or more ML models used by a content retrieval engine may be trained.

FIG. 1C depicts how one or more ML models used by the incident management system 114 may be trained by using the training mechanism 116. The training mechanism 116 may use both supervised and unsupervised training techniques. The supervised training may make use of labeled training data sets stored in the data store 122 to provide initial and ongoing training to the issue identification model 150, text encoding model 152, operating procedure representation model 156 and operating procedure generation model 158. It should be noted that each of the issue identification model 150, text encoding model 152, operating procedure representation model 156 and operating procedure generation model 158 may be representative of a plurality of ML models and/or classifiers.

In some implementations, the text encoding model 152 and operating procedure representation model 156 are trained by first applying unsupervised training techniques such as the nearest neighbor search in a distant metric space. Subsequently, supervised training may be applied by utilizing labeled training data that includes pairs of customer support issues and corresponding operating procedures that address the issues. The supervised training may use classification formulations that determine how issues and operating procedures are related from the training data. In an example, the text encoding model 152 and operating procedure representation model 156 are trained using a geometric progression-based algorithm that achieves manifold optimization by utilizing joint dimensionality reduction and the concept of Mahalanobis distance. As is known in the art, the Mahalanobis distance is a multi-dimensional generalization for measuring how many standard deviations a point is from the mean of a distribution.

The geometric progression training algorithm may utilize two matrices, a matrix X of size n by d and a matrix Z of size m by d, where n is the number of customer incident issues in the training set and d is the dimensionality of the features associated with the customer incident issues. Furthermore, m may represent the number of operating procedures, while d represents the dimensionality of the features associated with the operating procedures. Then a matrix Y of size m by n may be constructed such that $Y(i,j)=1$, if an operating procedure "j" is used to solve the issue "I", and $Y(i,j)=0$, if the operating procedure "j" is not used to solve the issue "I". In this manner, the matrix Y effectively captures the training data. Thus, the operating procedure discovery task can be accomplished by learning a matrix W of size d by d such that $X \times W = Y \times Z$. In some implementations, a classification loss function is used to solve $X \times W \times Z' = Y$. The matrix W may be further parameterized as $W = U \times B \times V'$, where U and V are rotation matrices and B is the Mahalanobis distance. Using manifold optimization algorithms, the models learn the parameters U, B, and V. The nearest neighbor search may be utilized using the cosine similarity metrics between $X \times U \times C$ and $Z \times V \times C$, where C is the matrix square root of B. In an example, the algorithm cross validates the lambda parameter from the set $\{1e\text{-}4, 1e\text{-}3, 1e\text{-}2, 1e\text{-}1, 1, 1e1, 1e2, 1e3\}$ and cross validates the rank constraint parameter from the set $\{50, 100, 300\}$.

In some implementations, to provide ongoing training, the training mechanism 116 may use training data sets received from each of the ML models. Furthermore, data may be provided from the training mechanism 116 to the data store 122 to update one or more of the training datasets in order to provide updated and ongoing training. Additionally, the training mechanism 122 may receive training data such as knowledge from other pre-trained mechanisms.

Figure 2:
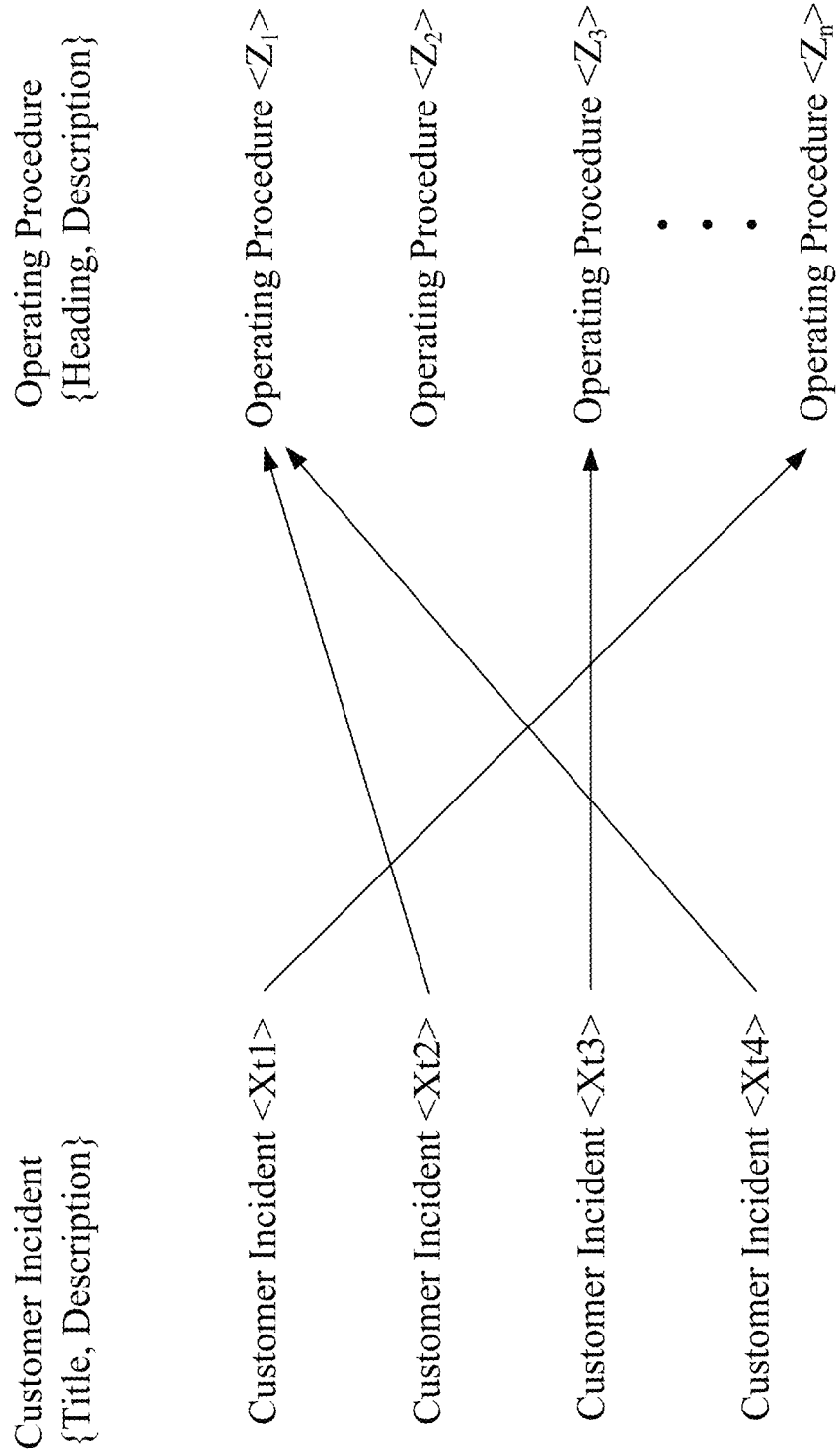
FIG. 2 depicts an example of matching customer incident issues with operating procedures.

FIG. 2 depicts an example of matching customer incident issues with operating procedures. After the models used by the incident management system 114 have been trained, they may be used to identify operating procedures for a newly received customer support request. As discussed above, when a customer support incident (e.g., customer issue) has been identified, it may be compared against representations of the operating procedures in an operating procedures library to identify one or more operating procedures that can be used to address the incident. As depicted in FIG. 2, for different customer incidents such as customer incidents $<Xt_1>$ through $<Xt_4>$, where X represents the matrix representation of the customer support incident and t represents the time at which the request was received, each incident may be compared against the vector representations of the available operating procedures (e.g., operating procedure $<Z_1>$ through operating procedure $<Z_n>$). This may involve computing the similarity score as a cosine similarity between $X \times U \times C$ and $Z_i \times V \times C$ for $i = \{1, 2, \ldots, n\}$. The similarity scores may then be sorted to obtain the top k scores (e.g., where k is a predetermined threshold). One or more of the top operating procedures may then be identified as a match for each customer incident. For example, the operating procedure $<Z_1>$ may be identified as being closely associated with both customer incident $<Xt_1>$ and $<Xt_2>$.

Figure 3:
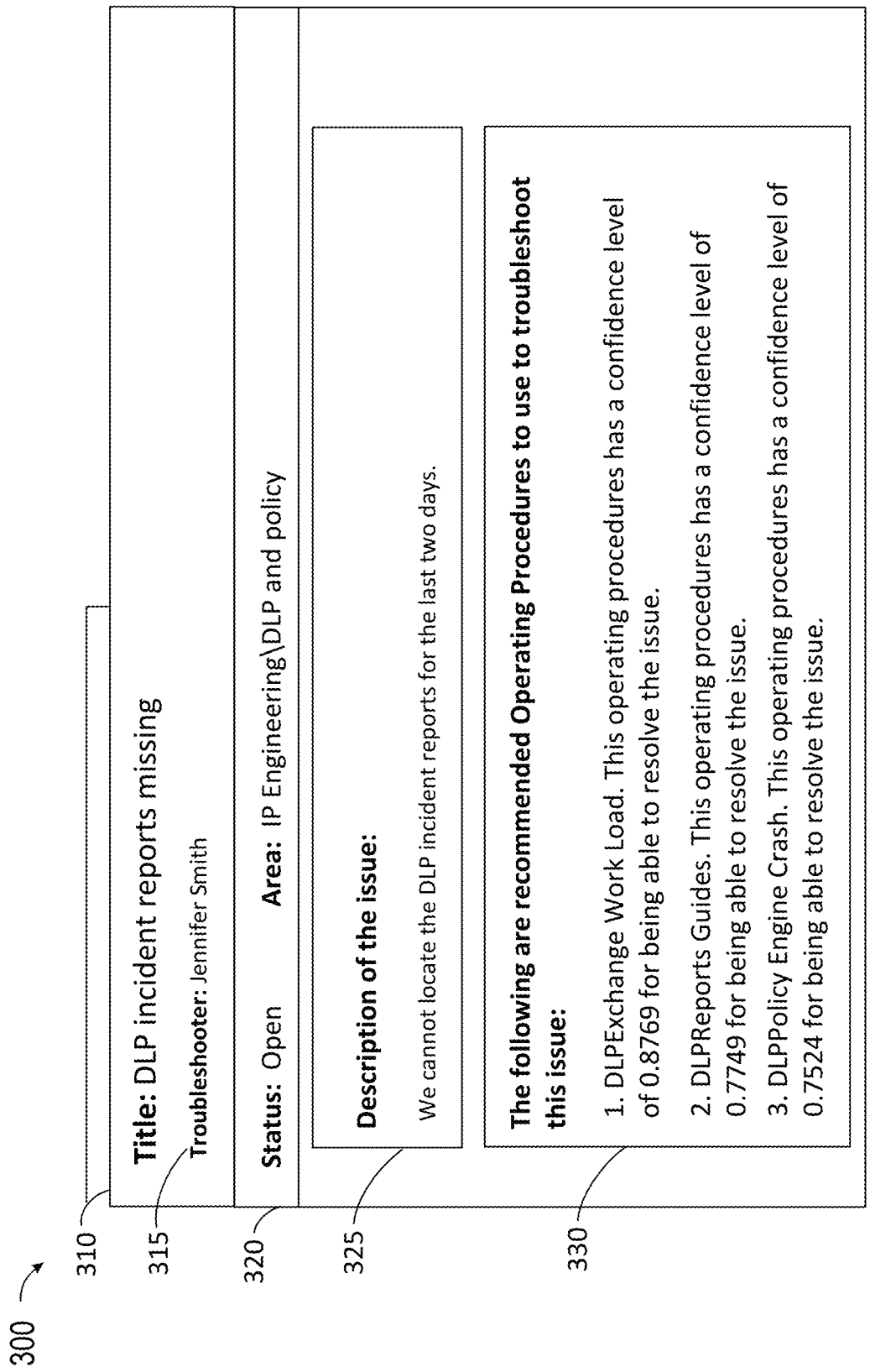
FIG. 3 depicts an example GUI screen of an application or service that provides incident management services.

FIG. 3 depicts an example GUI screen of an application or service that provides incident management services. FIG. 3 depicts an example GUI screen 300 of an incident management application that can be used by a customer to submit a customer support request. In some implementations, the same application may be used by a troubleshooter to review, analyze, and/or address a submitted customer support request. GUI screen 300 displays a submitted customer support request. The GUI screen 300 may include a UI portion 310 containing the title of the submitted customer support request and information about a troubleshooter assigned to the ticket. The troubleshooter may be assigned automatically or manually depending on the needs and settings of the incident management system.

The GUI screen 300 may also include a UI portion 320 for displaying more detailed information about the customer support request. The additional information may include a status indicator for displaying the current status of the ticket (e.g., open, closed, under review, etc.). Moreover, the UI portion 320 may include an area indicator for displaying the area to which the customer support request relates. The area may be determined manually by a troubleshooter or another administrator who reviews customer support requests. Alternatively, the area may be determined automatically via the incident management system by for example analyzing the title and/or description of the issue.

The GUI screen 300 may also include a UI portion 325 for displaying the description of the issue as submitted by the customer and a UI portion 330 for displaying automatically identified operating procedures for addressing the issue. This may enable a troubleshooter to review the customer support request quickly and efficiently in the same screen as the one where recommended operating procedures are displayed. The UI portion 330 may display the top ranked operating procedures that are identified as being a match for the customer support issue. The UI portion 330 may display the identified operating procedures in an order of their similarity score with the raised issue.

In some implementations, one or more of the identified operating procedures are selectable links such that the document containing the operating procedure can be opened directly from the UI portion 330, when an operating procedure is selected (e.g., clicked on). For example, the user can open an operating procedure by utilizing an input/output device such as a mouse to click on one of the recommended operating procedures in the UI portion 330. The user is thus able to quickly access the instructions for resolving the issue. The UI portion 330 may be displayed to both the troubleshooter and/or the customer such that either one can utilize the recommended operating procedures to address the issue.

Figure 4:
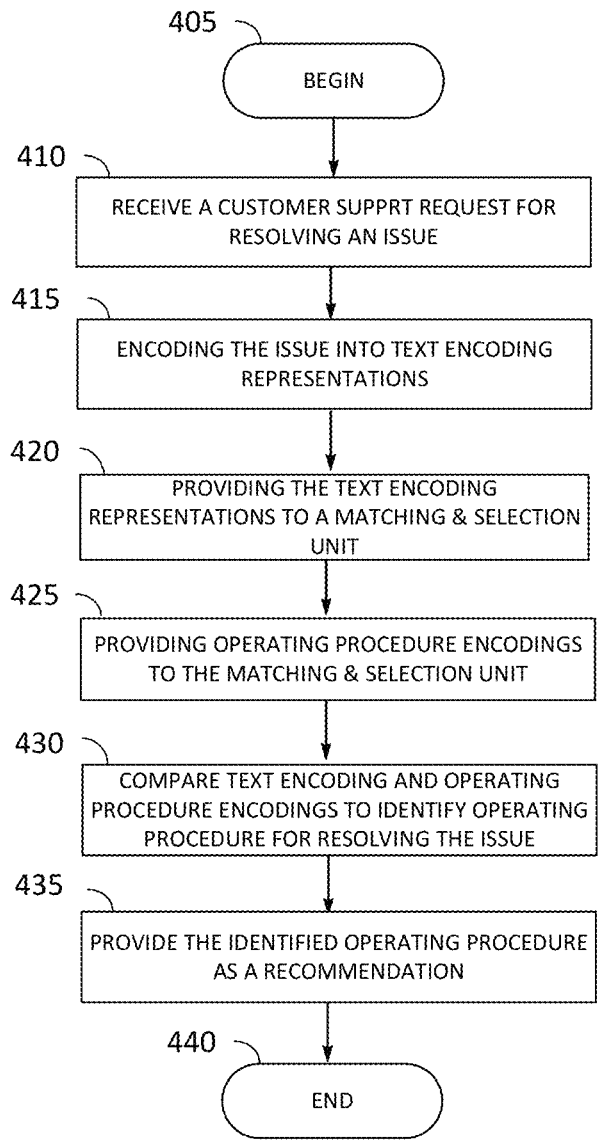
FIG. 4 is a flow diagram depicting an exemplary method for intelligently identifying operating procedures for resolving a customer support issue.

FIG. 4 is a flow diagram depicting an exemplary method 400 for intelligently identifying operating procedures for resolving a customer support issue. One or more steps of the method 400 may be performed by an incident management system such as the incident management system 114 of FIGS. 1A-1B or by an application such as applications 112/134 of FIGS. 1A-1B. The method 400 may begin, at 405, and proceed to receive a customer support request, at 410. This may occur, for example, when a user submits a customer support ticket via a customer portal or via a communications mechanism (e.g., an email to a troubleshooting team which is transmitted to the incident management system). The request may include a title, description of the issue encountered and/or metadata about the customer, device, software application, date/time of the request and the like. The request may be submitted by utilizing a client device and may then be transmitted via a network to an incident management system.

Once the customer support request is received, the data associated with the request may be analyzed to identify one or more issues associated with the request. This may involve simply analyzing the title and/or description of the issue as provided by the user, eliminating words, phrases or characters that are not likely to be representative of the issue (e.g., stop words) and utilizing the remaining text as the identified issue. Once the issue is identified, method 400 may proceed to encode the issue into one or more text encoding representations, at 415. This may be done by utilizing a trained text encoding ML model that converts the textual data into encodings. The encodings may then be transmitted to a matching and selection unit, at 420. Operating procedures encodings that have previously been generated from operating procedures may then be provided to the matching and selection unit, at 425.

The matching and selection unit may then compare the text encodings to the operating procedure encodings to identify operating procedures that are likely to address the issue raised in the customer support request, at 430. In some implementations, this involves computing a similarity score between the text encodings and the operating procedure encodings and selecting a plurality of operating procedures having top similarity scores as the identified operating procedures. In an example, operating procedures having similarity scores that are higher than a given threshold are selected as the results. In an alternative implementation, operating procedures having the top n number (e.g., when n is an integer) of similarity scores are selected. The identified operating procedures may then be provided as recommended operating procedures, at 435, before method 400 ends, at 440. Providing the identified operating procedures may involve transmitting information about the identified operating procedures to an application for display to the user. The information may include a name (e.g., title) of the operating procedure and/or a link to the location at which the operating procedure is stored, such that the link may be displayed to the user for quick access.

Figure 5:
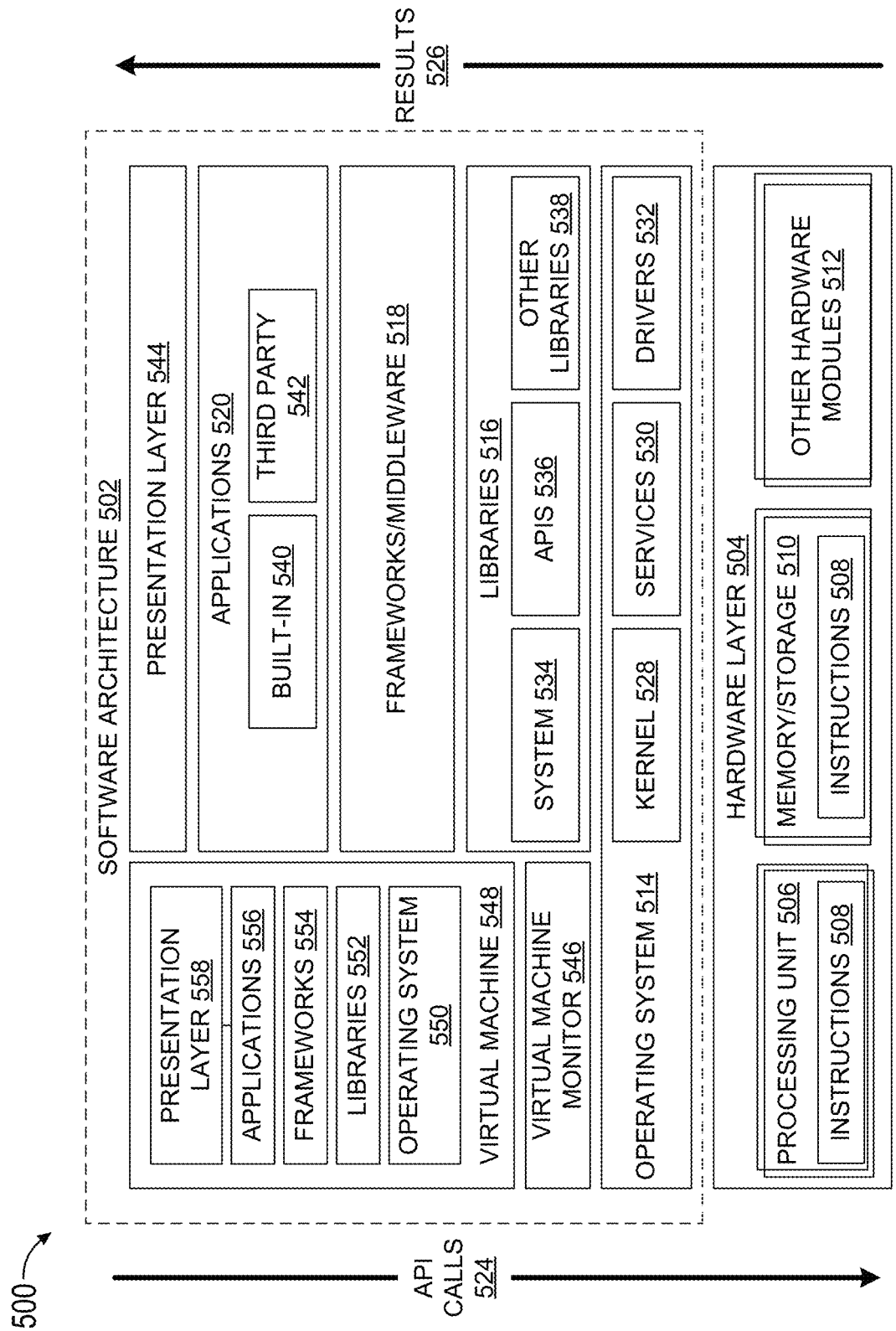
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
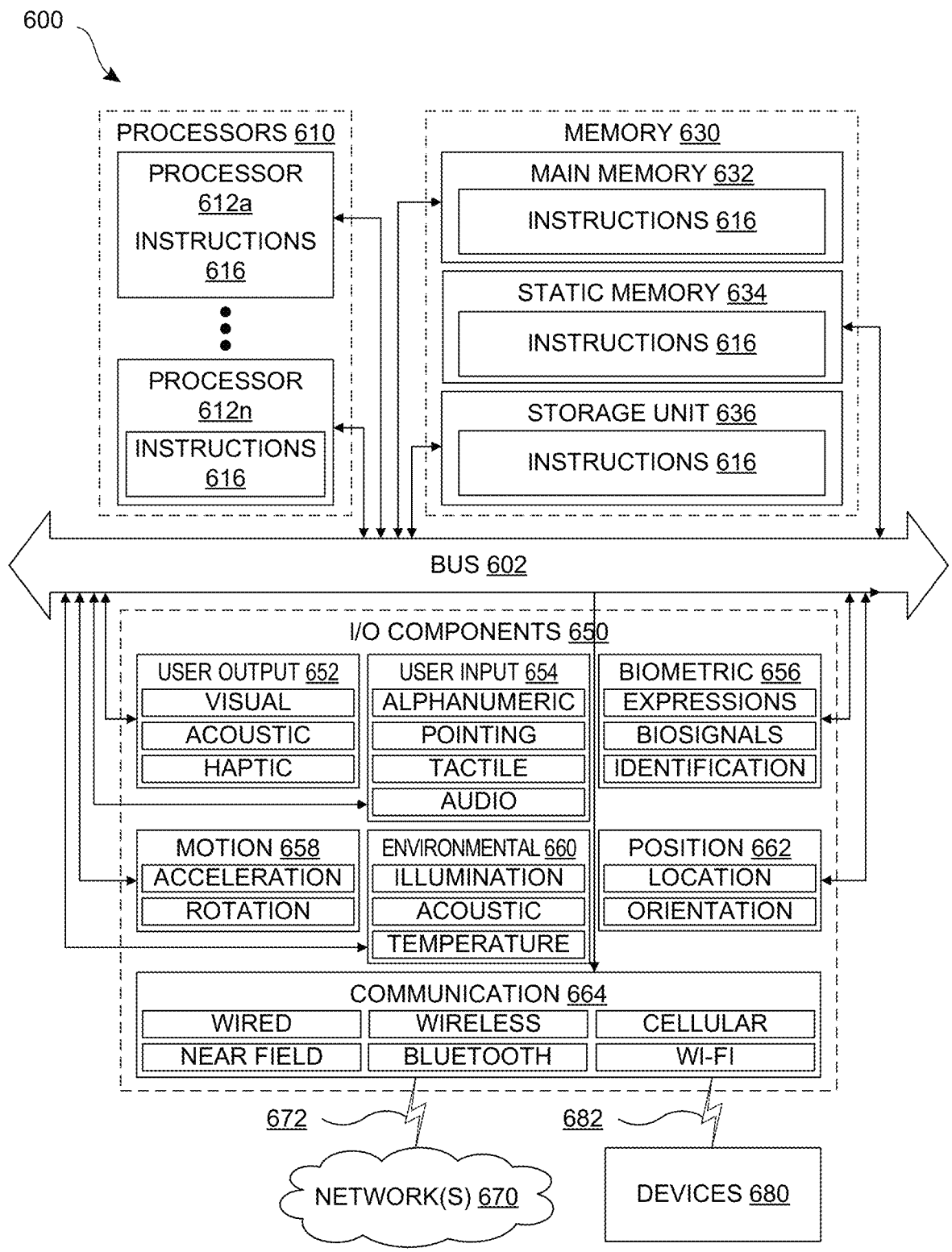
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
receiving a customer support request for resolving an issue;
encoding the issue into one or more text encoding representations;
providing the one or more text encoding representations as a first input to a matching and selection unit;
providing operating procedure encodings for a plurality of operating procedures as a second input to the matching and selection unit;
comparing, by the matching and selection unit, the one or more text encoding representations to the operating procedure encodings to identify one or more operating procedures for resolving the issue; and
providing the one or more operating procedures as recommendations for resolving the issue,
wherein at least one of the one or more text encoding representations and the operating procedure encodings are generated by utilizing a geometric progressing natural language processing (NLP) algorithm.

Item 2. The data processing system of item 1, wherein the matching and selection unit utilizes the geometric progressing natural NLP algorithm to compare the one or more text encoding representations with the operating procedure encodings.

Item 3. The data processing system of any of items 1 or 2, wherein the matching and selection unit calculates a similarity score between the one or more text encoding representations and one or more of the operating procedure encodings.

Item 4. The data processing system of item 3, wherein calculating the similarity score includes rotating at least one of the one or more text encoding representations or one or more of the operating procedure encodings by a given rotation degree.

Item 5. The data processing system of any preceding item, wherein one or more of the plurality of operating procedures include instructions for resolving a specific customer support issue.

Item 6. The data processing system of any preceding item, wherein the executable instructions, when executed by the processor, further cause the data processing system to perform functions of:
determining that an operating procedure for resolving the issue is not available;
upon determining that an operating procedure for resolving the issue is not available, automatically generating a new operating procedure for resolving the issue.

Item 7. The data processing system of item 6, wherein automatically generating a new operating procedure for resolving the issue includes:
retrieving at least one of incident history data and audit data;
analyzing the received incident history data to identify one or more past incidents that are similar to the issue raised by the customer support request;
analyzing at least one of the incident history data and audit data to detect one or more commands used to resolve the one or more identified past incidents; and
utilizing the one or more commands to generate the new operating procedure.

Item 8. The data processing system of item 7, wherein utilizing the one or more commands to generate the new operating procedure includes:
analyzing the one or more commands to identify a type for each of the one or more commands;
utilizing the type to create a structure for each of the one or more commands;
creating an order for the one or more commands; and
generating one or more descriptive sections for the new operating procedure.

Item 9. A method for automatically identifying an operating procedure for resolving a customer support request comprising:
receiving the customer support request for resolving an issue;
encoding the issue into one or more text encoding representations;
providing the one or more text encoding representations as a first input to a matching and selection unit;
providing operating procedure encodings for a plurality of operating procedures as a second input to the matching and selection unit;
comparing, by the matching and selection unit, the one or more text encoding representations to the operating procedure encodings to identify one or more operating procedures for resolving the issue; and
providing the one or more operating procedures as recommendations for resolving the issue,
wherein at least one of the one or more text encoding representations and the operating procedure encodings are generated by utilizing a geometric progressing natural language processing (NLP) algorithm.

Item 10. The method of item 9, wherein the matching and selection unit utilizes the geometric progressing natural NLP algorithm to compare the one or more text encoding representations with the operating procedure encodings.

Item 11. The method of any of items 9 or 10, wherein the matching and selection unit calculates a similarity score between the one or more text encoding representations and one or more of the operating procedure encodings.

Item 12. The method of item 11, wherein calculating the similarity score includes rotating at least one of the one or more text encoding representations or one or more of the operating procedure encodings by a given rotation degree.

Item 13. The method of any of items 9-12, further comprising:
determining that an operating procedure for resolving the issue is not available;
upon determining that an operating procedure for resolving the issue is not available, automatically generating a new operating procedure for resolving the issue.

Item 14. The method of item 13, wherein automatically generating a new operating procedure for resolving the issue includes:

retrieving at least one of incident history data and audit data;

analyzing the received incident history data to identify one or more past incidents that are similar to the issue raised by the customer support request;

analyzing at least one of the incident history data and audit data to detect one or more commands used to resolve the one or more identified past incidents; and utilizing the one or more commands to generate the new operating procedure.

Item 15. The method of item 14, wherein utilizing the one or more commands to generate the new operating procedure includes:

analyzing the one or more commands to identify a type for each of the one or more commands;

utilizing the type to create a structure for each of the one or more commands;

creating an order for the one or more commands; and generating one or more descriptive sections for the new operating procedure.

Item 16. A non-transitory computer readable medium on which are stored instructions that, when executed, cause a programmable device to perform functions of:

receiving a customer support request for resolving an issue;

encoding the issue into one or more text encoding representations;

providing the one or more text encoding representations as a first input to a matching and selection unit;

providing operating procedure encodings for a plurality of operating procedures as a second input to the matching and selection unit;

comparing, by the matching and selection unit, the one or more text encoding representations to the operating procedure encodings to identify one or more operating procedures for resolving the issue; and providing the one or more operating procedures as recommendations for resolving the issue, wherein at least one of the one or more text encoding representations and the operating procedure encodings are generated by utilizing a geometric progressing natural language processing (NLP) algorithm.

Item 17. The non-transitory computer readable medium of item 16, wherein the matching and selection unit utilizes the geometric progressing natural NLP algorithm to compare the one or more text encoding representations with the operating procedure encodings.

Item 18. The non-transitory computer readable medium of any of items 16 or 17, wherein the instructions when executed, further cause a programmable device to perform functions of:

determining that an operating procedure for resolving the issue is not available;

upon determining that an operating procedure for resolving the issue is not available, automatically generating a new operating procedure for resolving the issue.

Item 19. The non-transitory computer readable medium of item 18, wherein automatically generating a new operating procedure for resolving the issue includes:

retrieving at least one of incident history data and audit data;

analyzing the received incident history data to identify one or more past incidents that are similar to the issue raised by the customer support request;

analyzing at least one of the incident history data and audit data to detect one or more commands used to resolve the one or more identified past incidents; and utilizing the one or more commands to generate the new operating procedure.

Item 20. The non-transitory computer readable medium of item 19, wherein the instructions when executed, further cause a programmable device to perform functions of:

providing the new operating procedure as an input to an operating procedure representation model; and receiving an encoding for the new operating procedure as an output of the operating procedure representation model.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory comprising executable instructions for execution by the processor to perform:
   receiving a technical support request for resolving a technical issue with a computer system or software;
   encoding the technical issue into one or more text encoding representations via a trained text encoding model in a manner that the one or more text encoding representations correspond to one or more concepts of one or more of a plurality of operating procedures by applying a rotation to the one or more text encoding representations to enable optimized matching with the plurality of operating procedures;
   providing the one or more text encoding representations as a first input to a matching and selection unit;
   generating, via a trained operating procedure representation model, operating procedure encodings for the plurality of operating procedures;
   providing the operating procedure encodings for the plurality of operating procedures as a second input to the matching and selection unit;
   comparing, by the matching and selection unit, the one or more text encoding representations to the operating procedure encodings to automatically identify one or more operating procedures for resolving the technical issue;
   providing the automatically identified one or more operating procedures as recommendations for resolving the technical issue with the computer system or software;
   receiving feedback data from the trained operating procedure representation model;
   updating the trained operating procedure representation model using the received feedback data to, with a plurality of different training approaches, generate multiple different trained operating procedure representation models and assessing one of accuracy, computational efficiency or power efficiency for each of the different trained operating procedure representation models;
   selecting one of the multiple different trained operating procedure representation models based on the assessed one or more of accuracy, computational efficiency or power efficiency; and
   regenerating the operating procedure encodings with the selected operating procedure representation model from among the multiple different trained operating procedure representation models.

2. The data processing system of claim 1, wherein the matching and selection unit utilizes a geometric progressing natural language processing algorithm to compare the one or more text encoding representations with the operating procedure encodings.

3. The data processing system of claim 1, wherein the matching and selection unit calculates a similarity score between the one or more text encoding representations and one or more of the operating procedure encodings.

4. The data processing system of claim 3, wherein calculating the similarity score includes rotating at least one of the one or more text encoding representations or one or more of the operating procedure encodings by a given rotation degree.

5. The data processing system of claim 1, wherein one or more of the plurality of operating procedures include instructions for resolving the technical issue.

6. The data processing system of claim 1, wherein the executable instructions, when executed by the processor, further cause the data processing system to perform:
   determining that an operating procedure for resolving the technical issue is not available; and
   upon determining that the operating procedure for resolving the technical issue is not available, automatically generating a new operating procedure for resolving the technical issue.

7. The data processing system of claim 6, wherein automatically generating a new operating procedure for resolving the technical issue includes:
   retrieving at least one of incident history data and audit data;
   analyzing the retrieved incident history data to identify one or more past incidents that are similar to the technical issue raised by the technical support request;
   analyzing at least one of the incident history data and audit data to detect one or more commands used to resolve the one or more identified past incidents; and
   utilizing the one or more commands to generate the new operating procedure.

8. The data processing system of claim 7, wherein utilizing the one or more commands to generate the new operating procedure includes:
   analyzing the one or more commands to identify a type for each of the one or more commands;
   utilizing the type to create a structure for each of the one or more commands;
   creating an order for the one or more commands; and
   generating one or more descriptive sections for the new operating procedure.

9. A method for automatically identifying an operating procedure for resolving a technical support request comprising:
   receiving a technical support request for resolving a technical issue with a computer system or software;
   encoding the technical issue into one or more text encoding representations via a trained text encoding model in a manner that the one or more text encoding representations correspond to one or more concepts of one or more of a plurality of operating procedures by applying a rotation to the one or more text encoding representations to enable optimized matching with the plurality of operating procedures;
   providing the one or more text encoding representations as a first input to a matching and selection unit;
   providing operating procedure encodings for the plurality of operating procedures as a second input to the matching and selection unit;
   comparing, by the matching and selection unit, the one or more text encoding representations to the operating procedure encodings to automatically identify one or more operating procedures for resolving the technical issue;

providing the automatically identified one or more operating procedures as recommendations for resolving the technical issue with the computer system or software;

updating the trained operating procedure representation model using received feedback data to, with a plurality of different training approaches, generate multiple different trained operating procedure representation models and assessing one of accuracy, computational efficiency or power efficiency for each of the different trained operating procedure representation models;

selecting one of the multiple different trained operating procedure representation models based on the assessed one or more of accuracy, computational efficiency or power efficiency; and regenerating the operating procedure encodings with the selected operating procedure representation model from among the multiple different trained operating procedure representation models.

10. The method of claim 9, wherein the matching and selection unit utilizes a geometric progressing natural language processing algorithm to compare the one or more text encoding representations with the operating procedure encodings.

11. The method of claim 9, wherein the matching and selection unit calculates a similarity score between the one or more text encoding representations and one or more of the operating procedure encodings.

12. The method of claim 11, wherein calculating the similarity score includes rotating at least one of the one or more text encoding representations or one or more of the operating procedure encodings by a given rotation degree.

13. The method of claim 9, further comprising:
determining that an operating procedure for resolving the technical issue is not available; and
upon determining that the operating procedure for resolving the technical issue is not available, automatically generating a new operating procedure for resolving the technical issue.

14. The method of claim 13, wherein automatically generating a new operating procedure for resolving the technical issue includes:
retrieving at least one of incident history data and audit data;
analyzing the retrieved incident history data to identify one or more past incidents that are similar to the technical issue raised by the technical support request;
analyzing at least one of the incident history data and audit data to detect one or more commands used to resolve the one or more identified past incidents; and
utilizing the one or more commands to generate the new operating procedure.

15. The method of claim 14, wherein utilizing the one or more commands to generate the new operating procedure includes:
analyzing the one or more commands to identify a type for each of the one or more commands;
utilizing the type to create a structure for each of the one or more commands;
creating an order for the one or more commands; and
generating one or more descriptive sections for the new operating procedure.

16. A non-transitory computer readable medium on which are stored instructions for execution by a processor to perform:
receiving a technical support request for resolving a technical issue with a computer system or software;
encoding the technical issue into one or more text encoding representations via a trained text encoding model in a manner that the one or more text encoding representations correspond to one or more concepts of one or more of a plurality of operating procedures by applying a rotation to the one or more text encoding representations to enable optimized matching with the plurality of operating procedures;
providing the one or more text encoding representations as a first input to a matching and selection unit;
providing operating procedure encodings for the plurality of operating procedures as a second input to the matching and selection unit;
comparing, by the matching and selection unit, the one or more text encoding representations to the operating procedure encodings to automatically identify one or more operating procedures for resolving the technical issue;
providing the automatically identified one or more operating procedures as recommendations for resolving the technical issue with the computer system or software;
updating the trained operating procedure representation model using received feedback data to, with a plurality of different training approaches, generate multiple different trained operating procedure representation models and assessing one of accuracy, computational efficiency or power efficiency for each of the different trained operating procedure representation models;
selecting one of the multiple different trained operating procedure representation models based on the assessed one or more of accuracy, computational efficiency or power efficiency; and
regenerating the operating procedure encodings with the selected operating procedure representation model from among the multiple different trained operating procedure representation models.

17. The non-transitory computer readable medium of claim 16, wherein the matching and selection unit utilizes a geometric progressing natural language processing algorithm to compare the one or more text encoding representations with the operating procedure encodings.

18. The non-transitory computer readable medium of claim 16, wherein the instructions when executed, further cause a programmable device to perform functions of:
determining that an operating procedure for resolving the technical issue is not available; and
upon determining that the operating procedure for resolving the technical issue is not available, automatically generating a new operating procedure for resolving the technical issue.

19. The non-transitory computer readable medium of claim 18, wherein automatically generating a new operating procedure for resolving the technical issue includes:
retrieving at least one of incident history data and audit data;
analyzing the retrieved incident history data to identify one or more past incidents that are similar to the technical issue raised by the technical support request;
analyzing at least one of the incident history data and audit data to detect one or more commands used to resolve the one or more identified past incidents; and
utilizing the one or more commands to generate the new operating procedure.

20. The non-transitory computer readable medium of claim 19, wherein the instructions when executed, further cause a programmable device to perform functions of:

providing the new operating procedure as an input to an operating procedure representation model; and receiving an encoding for the new operating procedure as an output of the operating procedure representation model.

* * * * *